Figure 1:
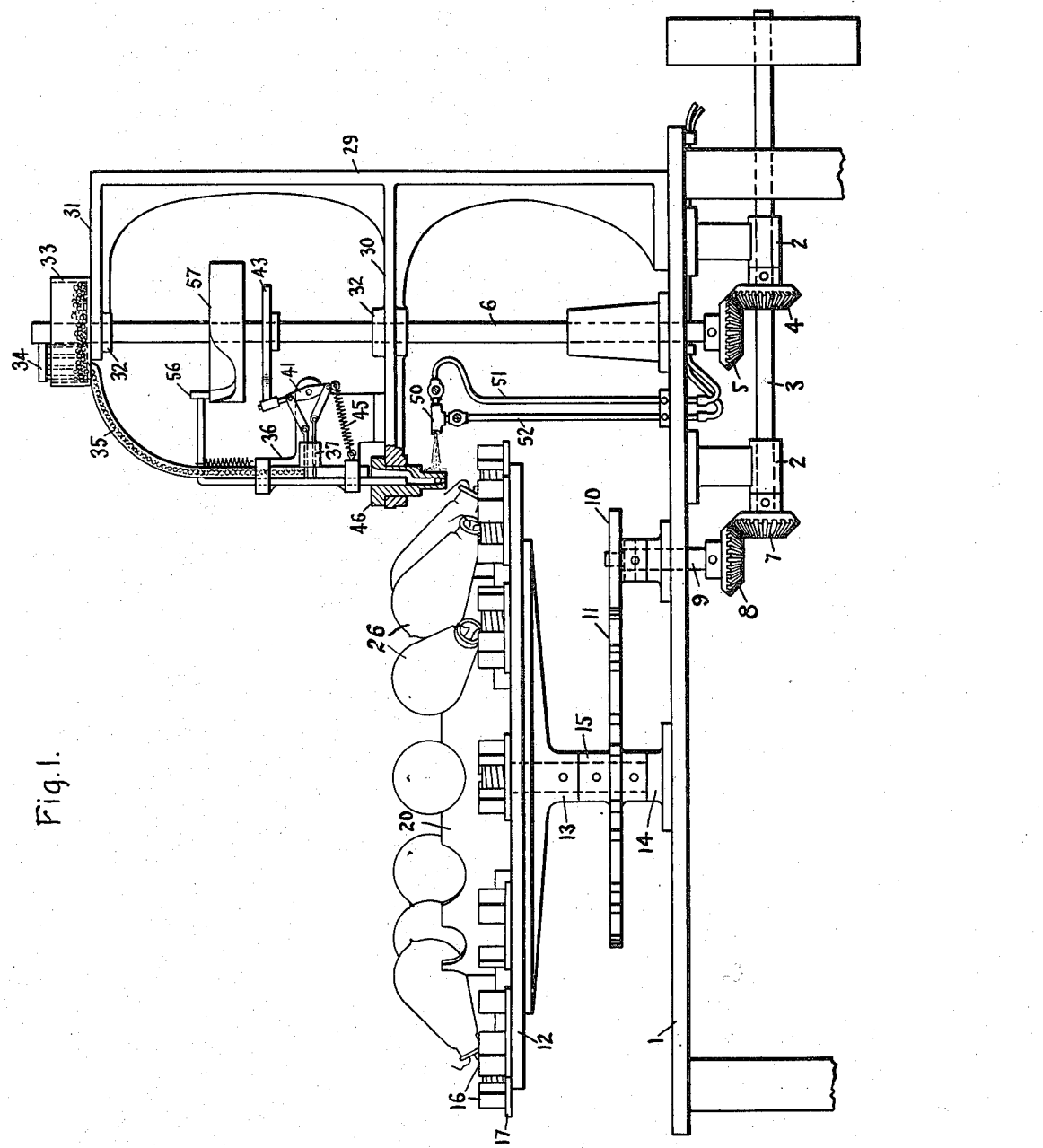

A. SWAN.
SOLDERING MACHINE.
APPLICATION FILED SEPT. 18, 1907.

996,374.

Patented June 27, 1911.

3 SHEETS—SHEET 1.

Witnesses:
Irving E. Steers.
J. Ellis Glen

Inventor
Alfred Swan,
by Albert H. Davis
Att'y.

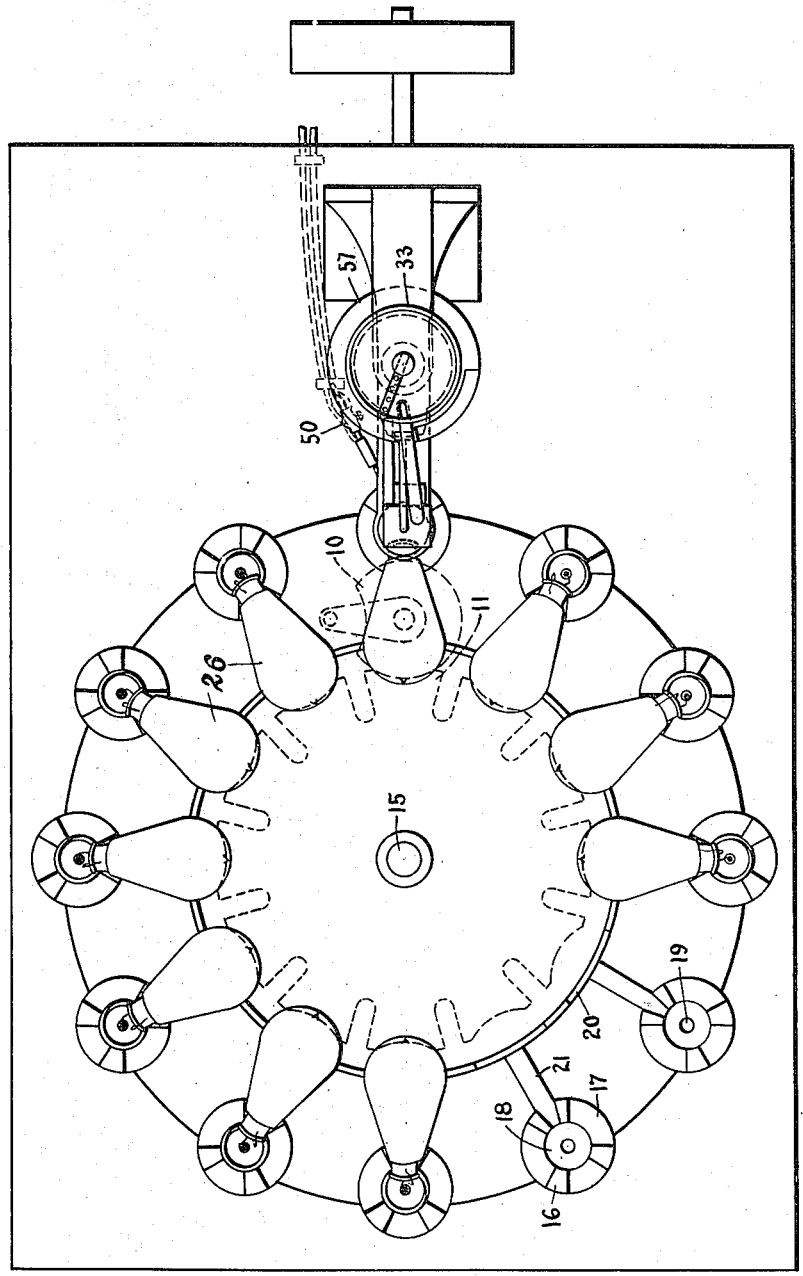

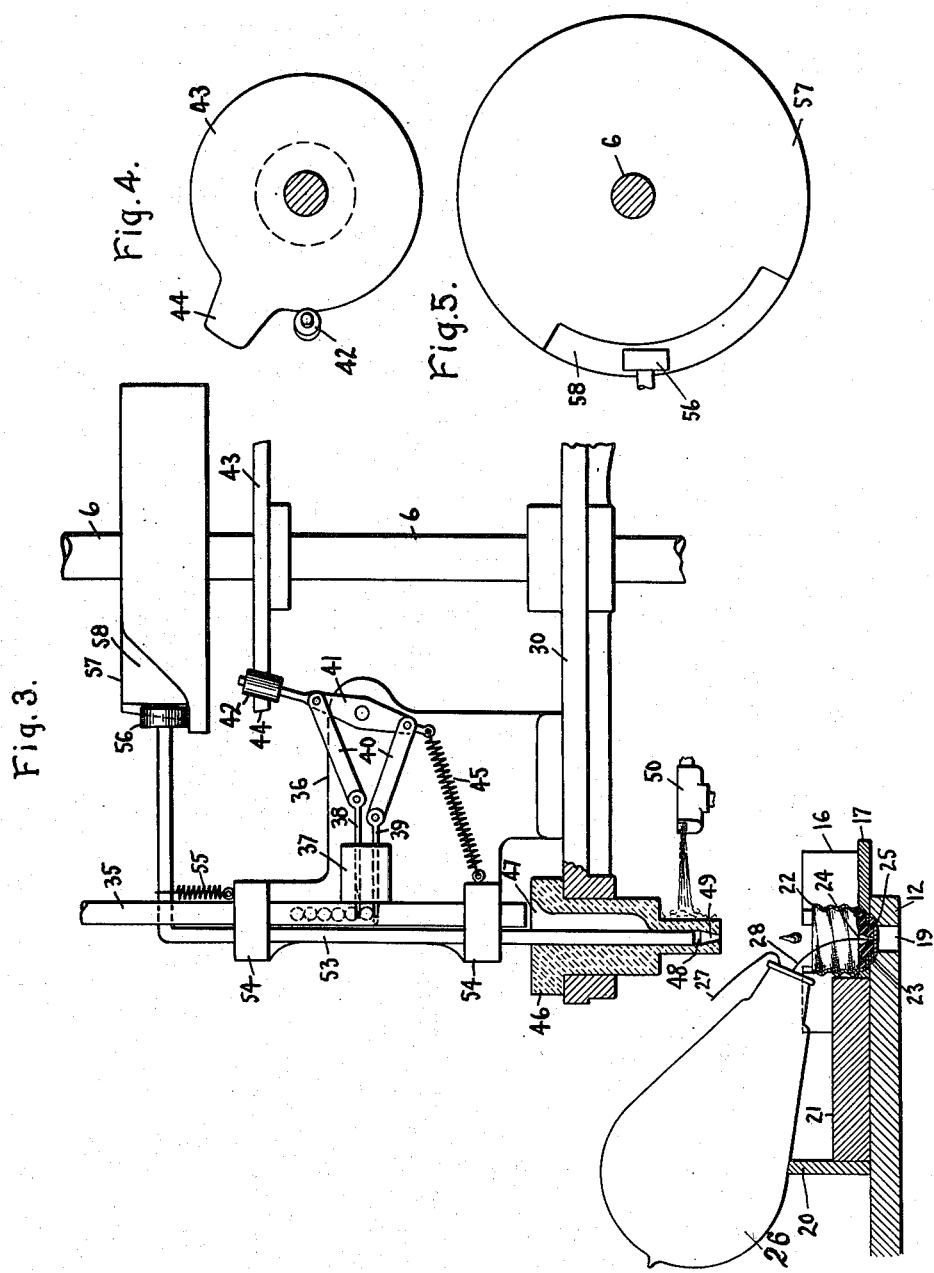

UNITED STATES PATENT OFFICE.

ALFRED SWAN, OF UPPER MONTCLAIR, NEW JERSEY, ASSIGNOR TO GENERAL ELECTRIC COMPANY, A CORPORATION OF NEW YORK.

SOLDERING-MACHINE.

996,374.

Specification of Letters Patent.   Patented June 27, 1911.

Application filed September 18. 1907. Serial No. 393,492.

*To all whom it may concern:*

Be it known that I, ALFRED SWAN, a subject of the King of Great Britain, residing at Upper Montclair, in the county of Essex and State of New Jersey, have invented certain new and useful Improvements in Soldering-Machines, of which the following is a specification.

My invention relates to soldering machines, and more particularly to machines to be used in the manufacture of incandescent lamps to solder the leading-in wires to the base of the lamp.

In an ordinary incandescent lamp adapted to be used in a screw-socket, one of the leading-in wires of the lamp is soldered to a screw-threaded metallic shell which fits the socket, and the other to a metallic disk or center contact insulated from the threaded shell and secured in position on the base by an operation separate and distinct from that of soldering the leading-in wire to the center contact. The soldering is done by hand in a slow and expensive manner as the leading-in wire must be passed through a hole in the center contact and solder applied from the outside of the base to fasten the wire to the contact. This operation is slow and tedious, and the solder often forms a rough projection on the center contact, which must be smoothed away by a file or similar device thereby adding to the expense of the construction of the lamp.

The object of my invention is to provide a machine which enables an unskilled operator to solder various articles together rapidly and accurately; which is particularly useful to solder the leading-in wires of incandescent lamps to the contacts in the base of the lamp; which will cheapen lamp making by securing the center contact in place on the base and soldering the leading-in wire to it in one operation; which will automatically deliver the solder in accurately measured quantities to the junction of the parts to be soldered together and which will in general enable lamp manufacturers to do away with hand work and skilled labor in soldering in the leading-in wires.

In carrying out my invention, a suitable support or holder is used to hold the parts to be joined in proper relation to each other, and some suitable soldering device is arranged to deliver definite quantities of solder at a definite point. The support and soldering device are relatively movable and are so controlled that the junction of the parts to be joined is automatically brought into proper relation to the soldering device, which then delivers solder to the junction and firmly unites the parts. The support or holder is preferably movable, while the soldering device is fixed in such a position that the movement of the support brings the parts to be joined into such a position that the solder delivered by the soldering device will join them together. The soldering device may assume various forms but is preferably arranged to deliver a definite amount of molten solder to the junction of the parts to be joined. The amount of solder to be delivered may be measured out in various ways without departing from my invention, but in the preferred arrangement, pellets of solder are fed one at a time to a heater where each pellet is melted and the molten solder used before the next pellet is fed into the heater.

In order to eliminate the operation of fixing the center contact to the base before soldering in the leading-in wire, the base is so formed or shaped that the solder, which connects the leading-in wire and the center contact also holds the center contact in position. The support or holder is preferably arranged so that the base, center contact and leading-in wire are held in proper relation and carried to the soldering device where a drop of molten solder is delivered to the junction of the center contact and the leading-in wire, firmly soldering them together and at the same time fastening the center contact to the base. This result is best attained by making a funnel-shaped opening in the base, placing the center contact at the small end of the opening, placing the leading-in wire in the opening in engagement with the center contact, and then filling the opening with molten solder, which joins the leading-in wire to the center contact and solidifies in the opening in the shape of a cone with the center contact attached to the small end.

My invention will best be understood in connection with the accompanying drawings, which illustrate one embodiment of my invention, and in which—

Figure 1 is a side view partly in section of a soldering machine for incandescent lamps; Fig. 2 a plan view of the machine shown in Fig. 1; Fig. 3 an enlarged side view partly in section of the soldering device and the support or holder for the lamp bulb and base; Fig. 4 a plan view of the cam for actuating the feeding mechanism of the soldering device; and Fig. 5 a plan view of the cam for actuating the ejector on the soldering device.

In the particular arrangement shown in the drawings, the various elements of the machine are carried by a base or table 1 carrying bearings 2 in which a driving shaft 3 for supplying power to the machine is rotatably mounted and driven by a pulley or in any suitable manner. The soldering device is actuated from the driving shaft 3 by means of a gear 4 meshing with a corresponding gear 5 keyed to a counter-shaft 6 of the soldering device, while the support or holder for the parts to be joined is driven from the driving shaft by means of a gear 7 keyed to the driving shaft and meshing with a gear 8 connected to a short counter-shaft 9 mounted in a suitable bearing upon the base or table 1. The carrier or holder for the parts to be joined may be of any suitable form, and is preferably given an intermittent motion from the counter-shaft 9 by means of any suitable mechanism which will move the carrier with a dwell or pause in its movement.

The particular arrangement shown in the drawings for moving the carrier or support comprises a pinion 10 mounted on the upper end of the counter-shaft 9 and coöperating with a mutilated gear wheel 11. The pinion 10 has a portion cut away and also carries a projection which engages the slots in the gear wheel 11, as shown in dotted lines in Fig. 2, the pinion and the gear wheel coöperating to form a Geneva stop motion by means of which the rotatable carrier or support 12 is given an intermittent motion and is locked stationary between its period of movement to produce a dwell or pause. The driving shaft 3 not only transmits power to the soldering device and movable carrier, but also acts as a controlling mechanism for compelling the various elements of the machine to operate in a definite sequence and in proper time relation to each other to deliver solder to the parts to be joined.

The carrier or holder and soldering device should be relatively movable so that the solder from the soldering device can be delivered at the junction of each set of parts to be joined. Either the carrier or soldering device may be movable, but in the preferred construction, as illustrated in the drawings, the soldering device is stationary and the movable carrier or support brings the parts of the lamp to the soldering device. The movable carrier or support 12 is preferably made in the form of a circular table mounted on a hub 13, which rests upon the hub of the mutilated gear wheel 11, which in turn is supported by and turns upon a step or shoulder 14 secured to the base or table 1. A stub axle 15 mounted on the step or shoulder 14 acts as a pivotal axle about which the mutilated gear wheel 11 and the movable carrier or support 12 rotate.

The parts to be soldered together are held in position on the carrier in any suitable way, and the arrangement shown in the drawings comprises a plurality of spring clamps mounted near the periphery of the circular support. Each clamp consists of clamping jaws 16 formed to engage and hold the lamp bases, and secured to a platform or base 17 as shown in Fig. 3. When a base is held by the spring clamping jaws 16, the lower portion of it fits into a recess 18 cut through the platform 17 and into the carrier or support 12. A hole 19 extends from the bottom of the recess 18 through the carrier or support 12 and is smaller than the center contact, which may be placed in the recess 18 without falling through the hole 19. The lamp bulb is held in proper relation to the bases in the spring clamps by means of a yoke or bulb support, made in the shape of a ring extending at right angles to the surface of the support 12 and provided with recesses for receiving the lamp bulbs. As shown in Fig. 3, the clamps and the bulb support are held in proper relation to each other on the carrier 12 by means of space blocks 21.

The relation of the lamp bulb to the base when the parts are in position on the carrier 12 is best shown in Fig. 3. The base, which is of the usual form, consisting of a screw-threaded shell 22 closed at one end by a web 23 of glass or other suitable material is placed between the spring jaws in the spring clamp so that the lower end of the base fills the recess 18. A funnel-shaped hole 24 is made through the web 23 with the large end of the hole toward the interior of the shell 22. Before the base is placed in position, a center contact 25 is placed in the bottom of the recess 18 so that when the base is in position in the spring clamp, the lower end of the funnel-shaped hole 24 is closed by the center contact 25. The bulb 26 is then placed with the large end in one of the recesses in the bulb support 20 and the small end between the jaws 16 of the spring clamp.

One of the leading-in wires 27 is bent backward over the bulb so as to be out of the way, and the other wire 28 is bent downward to bring the end thereof into the funnel-shaped hole 24, and into engagement with the center contact 25. If desired, an insulating sleeve of paper or other suitable material may be slipped over the leading-in wire 28 before the wire is bent in the position shown in Fig. 3. After the parts are assembled, as shown in Fig. 3, the funnel-shaped hole 24 is filled with solder, which joins the leading-in wire to the center contact, and at the same time solidifies in the funnel-shaped hole in the form of a cone with the small end attached to the inner surface of the center contact. Owing to the shape of the hole 24, the solder not only fastens the leading-in wire to the center contact but it also interlocks with the web 23 and rigidly holds the center contact in position on the web, leaving the outer surface of the center contact perfectly smooth.

Any suitable means may be used to fill the hole 24 with solder after the parts are assembled in proper relation to each other, but the preferred device is arranged to deliver a definite and accurately measured amount of molten solder, which is just sufficient to fill the hole 24 and firmly solder the parts together. The proper amount of solder may, if desired, be measured out after the solder is melted, but in the preferred arrangement, the solder is made up in the form of shot or pellets, each of which contains just enough solder to fill the hole 24.

The mechanism for delivering the molten solder may assume various forms, but in the preferred arrangement, the various parts of the soldering device are mounted upon a vertical frame 29 secured to the table 1 and provided with horizontal brackets 30 and 31, which carry bearings 32 for the counter-shaft 6, and by means of which the device is actuated. The upper bracket 31 carries a hopper 33 for the pellets of solder, which are stirred up by means of a stirring device 34 mounted on and driven by the counter-shaft 6, so that the pellets feed freely into a delivery tube 35 by means of which they are carried to a heater to be melted.

The pellets of solder should be delivered to the heater one at a time, and one type of feeding mechanism by which this result can be accomplished is shown in Fig. 3. The various parts of the feeding mechanism are mounted on a frame 36 secured to the bracket 30 and carrying a guide 37 in which reciprocating slides 38 and 39, (Fig. 3) are mounted parallel to each other. The reciprocating slides are actuated by means of links 40 connected to a pivoted rocker arm 41 on the opposing sides of the pivot, so that when the rocker arm is moved, the slide 38 moves in one direction, and the slide 39 in the other. The rocker arm 41 carries a roller 42 at one end thereof, which engages a cam 43 mounted on the counter-shaft and provided with a projection 44 for positively moving the rocker arm 41 in one direction, the arm being returned and held with the roller 42 in engagement with the cam by a spring 45 connected to the end of the rocker arm and opposing the roller 42. The free ends of the slides 38 and 39 project into the delivery tube 35 through which the pellets of solder pass to the heater, and the slides are separated by a space slightly greater than the size of a pellet of solder. When the slide 38 is drawn back, the slide 39 is thrust forward and closes the delivery tube 35. The pellets of solder in the tube move downward until stopped by the slide 39, and when the rocker arm 41 is actuated, the slide 38 is thrust between the lowermost pellet and the pellet immediately above, thereby cutting off one pellet of solder from the mass contained in the delivery tube. As the slide 38 moves across the tube, the slide 39 moves backward, and eventually the pellet of solder caught between the two slides is free to fall through the lowermost portion of the delivery tube into the heater where it is melted.

The pellet of solder delivered by the feeding mechanism may be melted in various types of heaters, but a type which is considered desirable is shown in the drawings, and comprises a heating receptacle 46 of porcelain or other refractory material mounted in the bracket 30 immediately beneath the delivery end of the delivery tube 35. The heating receptacle is provided with an inlet passage 47 for receiving the pellets of solder from the delivery tube 35, a cylindrical portion 48 into which the pellet passes from the inlet passage 47, and a contracted funnel-shaped outlet 49 at the end of the cylindrical portion 48, which outlet is smaller than the pellet of solder so that the pellet remains lodged in the cylindrical portion of the heating receptacle. This portion of the receptacle is maintained at a temperature above the melting point of the solder by means of a heating device, such as a burner 50, supplied through an air pipe 51 and a gas pipe 52. As each pellet of solder is delivered into the heating receptacle, it passes through the inlet passage 47 into the cylindrical portion 48 and is retained there by the contracted or funnel-shaped outlet of the heating receptacle until melted, whereupon it drops through the outlet.

In order to make sure that each pellet of solder will be ejected from the heating receptacle after it has been melted, an ejecting device for positively forcing out the molten solder may be used. One form of device suitable for this purpose is shown in Fig. 3, and comprises an ejector or sliding rod 53, which fits the cylindrical portion 48 of the heating receptacle and reciprocates therein. The ejector is slidably mounted in guide lugs 54 on the frame 36 and is moved by means of a spring into the heating receptacle to force out the molten solder. The rod is moved in the other direction out of the cylindrical portion 48 far enough to permit a pellet of solder to pass into said cylindrical portion by means of a roller 56 on the end of the rod, which is engaged by a cam 57 mounted on the counter-shaft 6 and provided with a cutaway portion 58, which permits the spring 55 to draw the ejector into the cylindrical portion of the heating receptacle and positively eject the molten solder contained therein.

The operation of the machine is as follows: The operator places center contacts and the lamp bases in the spring clamps on the movable carrier and also places the lamp bulbs in proper relation to the bases, bending one of the leading-in wires of each bulb to bring it into engagement with the center contact. The intermittent movement of the carrier 12 eventually brings the bulb and base beneath the outlet of the soldering device. The Geneva motion by means of which the movable carrier is driven, causes the bulb and base to remain stationary beneath the outlet of the soldering device for a period of time, during which time the soldering device is actuated from the counter-shaft 6 to deliver the molten solder produced by one pellet through the contracted outlet of the heating receptacle and into the funnel-shaped opening 24 in the insulation 23. The molten solder may be forced into the funnel-shaped hole 24 in any suitable way, but the preferred arrangement is that shown in the drawings, where the lamp and base are brought beneath the outlet of the soldering device with the open end of the base upward so that the drop of molten solder delivered by the soldering device falls into and fills the funnel-shaped hole 24. The leading-in wire and center contact are thereby firmly soldered together, and at the same time the solder solidifies in the funnel-shaped hole 24 and holds the center contact 25 in firm engagement with the insulation 23. The support or carrier 12 is then moved to bring another bulb and base beneath the soldering device, and the above-described operation is repeated.

My invention may be embodied in many other forms than that shown and described, and I therefore do not wish to be restricted to the exact form shown, but intend to cover by the appended claims all changes and modifications within the spirit and scope of my invention.

What I claim as new and desire to secure by Letters Patent of the United States, is:—

1. In a soldering machine, the combination with a support for holding a lamp base and a leading-in wire in engagement with each other, of means for dropping a predetermined amount of molten solder upon the junction of the base and the leading-in wire.

2. In a soldering machine, the combination with a support for holding a lamp base with the open end upward and a leading-in wire with its end in proper relation to the interior of said base, of a soldering device for dropping molten solder, and means for moving said support and said soldering device relatively to each other to bring the end of said wire beneath said device and for operating said soldering device to drop molten solder on the wire to solder it to the base.

3. In a soldering machine, the combination with a movable support for holding a base and a leading-in wire with its end in engagement with the interior of said base, of a soldering device for delivering molten solder to the interior of said base, and common actuating means for said device and said support arranged to operate said soldering device to deliver molten solder into said base at the junction of the end of said leading-in wire and the base.

4. In a soldering machine, the combination with a support arranged to hold a lamp base and a leading-in wire in engagement, of a soldering device arranged to deliver molten solder, and means for moving said support and said device relatively to each other to bring the junction of said base and wire beneath said device and for actuating said device to drop molten solder on said junction.

5. In a soldering machine, the combination with a support arranged to hold a lamp base and a leading-in wire in engagement, of a soldering device having an outlet for molten solder, and means for intermittently moving said support to bring the junction of said base and wire beneath said outlet, said means being arranged to actuate said soldering device to drop molten solder on said parts at the junction thereof.

6. In a soldering machine, the combination with a support arranged to hold a lamp base and a leading-in wire in engagement, of a soldering device arranged to deliver molten solder when actuated, and means for moving said support to bring the junction of the base and wire beneath the soldering device and actuating said device to drop molten solder on the junction.

7. In a soldering machine, the combination with a support arranged to hold a lamp base and a leading-in wire in engagement, of a device arranged to deliver molten solder when actuated, and means arranged to move said support intermittently to bring the junction of said base and wire beneath the device and to actuate said device to deliver molten solder to the junction while said support is stationary.

8. In a soldering machine, the combination with a soldering device having an outlet and arranged to deliver molten solder through said outlet, of a rotatable support arranged to hold a lamp base and a leading-in wire in engagement and to carry them in proximity to the soldering device with the junction of said base and wire beneath said outlet, and actuating mechanism connected to said support and said device to actuate asid device when the junction of said base and wire is beneath said outlet.

9. In a soldering machine, the combination with a soldering device comprising a cam shaft and means actuated by said cam shaft to deliver molten solder through an outlet, of a rotatable support arranged to hold a lamp base and a leading-in wire in engagement and to bring the junction of the base and wire adjacent said outlet, and a driving shaft connected to said support and to said cam shaft to actuate the soldering device when the junction of the base and wire is adjacent said outlet.

10. In a soldering machine, the combination with a soldering device comprising a cam shaft and means actuated by said cam shaft to deliver molten solder through an outlet, of a rotatable carrier having clamps to hold a plurality of lamp bases and leading-in wires in engagement, with the junction of each base and wire in a position to be brought adjacent said outlet by the rotation of said carrier, and driving means for rotating the carrier with a dwell in its movement as each base and wire is adjacent said outlet connected to said cam shaft to actuate the soldering device during said dwell.

11. In a soldering machine, the combination with a soldering device comprising a cam shaft and means actuated by said cam shaft to deliver molten solder through an outlet, of a movable carrier with clamps arranged to hold a lamp base and a leading-in wire in engagement and moving the junction of said base and wire in a path intersecting the path of the molten solder delivered from said outlet, and common driving means for said carrier and said device arranged to actuate said device when the carrier brings the junction into the path of the solder.

12. In a soldering machine, the combination with a soldering device comprising a cam shaft and means actuated by said cam shaft to deliver molten solder to an outlet, of a rotatable support for moving the junction of each of a plurality of sets of lamp bases and leading-in wires to be joined beneath said outlet, a driving shaft, a mutilated gear connection between said shaft and said support to drive the support intermittently and hold each junction in succession stationary beneath said outlet, and connections between the shaft and the soldering device to actuate said device when a junction is beneath said outlet.

13. In a soldering machine, a soldering device comprising a tube having a contracted outlet, means for heating the tube, feeding mechanism for delivering solder to the tube, and ejecting mechanism for positively forcing the molten solder through said contracted outlet.

14. In a soldering machine, a soldering device comprising a tube having a contracted outlet, means for heating the tube, feeding mechanism for delivering to the tube a pellet of solder larger than said outlet, and a rod longitudinally movable in said tube to force the molten solder through the outlet.

15. In a soldering machine, a soldering device comprising a tube having a contracted outlet, means for heating the tube, feeding mechanism for delivering to the tube a pellet of solder larger than said outlet, a rod longitudinally movable in the tube, and operating means for actuating said feeding mechanism and said rod in predetermined sequence.

16. In a soldering machine, a soldering device comprising a tube having a contracted outlet, means for heating the tube, feeding mechanism for delivering to the tube a pellet of solder larger than said outlet, a rod longitudinally movable in said tube, a counter shaft, and connections for operating said feeding mechanism and moving said rod longitudinally by said countershaft.

17. In a soldering machine, a support comprising a clamp for holding a center contact and base in definite relation with the open end of the base upward, and means for holding a bulb to one side of the base with a leading-in wire from said bulb in engagement with said center contact.

18. In a soldering machine, the combination with a soldering device arranged to deliver molten solder through an outlet when actuated, of a movable support comprising means for holding a base and a center contact in definite relation and means for holding a bulb with its leading-in wire in engagement with said center contact so as to leave the open end of the base unobstructed, and common driving mechanism arranged to move the support to bring the open end of the base adjacent said outlet and to actuate the soldering device to inject molten solder into the base.

19. In a soldering machine for incandescent lamps, the combination with a support for holding the bulb and base in proper relation, said base having an opening through the web thereof, a contact over one end of said opening and a leading-in wire of the bulb in engagement with said contact, of means for filling said opening with solder to join the wire and contact and to interlock the contact to the web of the base.

20. In a soldering machine for incandescent lamps the combination with a support for a base having an insulating web with an opening having walls formed to interlock the web with the filling in the opening, and a center contact covering the end of said opening, of means for filling said opening with a heated plastic material adhering to the contact and solidifying when cool.

In witness whereof, I have hereunto set my hand this 16 day of September, 1907.

ALFRED SWAN.

Witnesses:
S. N. WHITEHEAD,
J. HARRY ELKINS.